(12) United States Patent
Schlummer et al.

(10) Patent No.: US 8,225,937 B2
(45) Date of Patent: Jul. 24, 2012

(54) METHOD FOR SEPARATING DIFFERENTLY ADDITIVATED POLYMER COMPONENTS AND USE THEREOF

(75) Inventors: Martin Schlummer, Ingolstadt (DE); Andreas Mäurer, Freising (DE)

(73) Assignee: Fraunhofer-Gesellschaft zur Forderung der angewandten Forschung, e.V., Munich (DE)

( * ) Notice: Subject to any disclaimer, the term of this patent is extended or adjusted under 35 U.S.C. 154(b) by 775 days.

(21) Appl. No.: 11/916,479

(22) PCT Filed: Jun. 8, 2006

(86) PCT No.: PCT/EP2006/005504
§ 371 (c)(1),
(2), (4) Date: Dec. 4, 2007

(87) PCT Pub. No.: WO2006/131377
PCT Pub. Date: Dec. 14, 2006

(65) Prior Publication Data
US 2008/0190819 A1    Aug. 14, 2008

(30) Foreign Application Priority Data
Jun. 8, 2005    (DE) .......................... 10 2005 026 450

(51) Int. Cl.
*B03B 5/60* (2006.01)
(52) U.S. Cl. ............................ 209/173; 209/18; 209/466
(58) Field of Classification Search .................... 209/13, 209/17, 18, 172, 172.5, 173, 466
See application file for complete search history.

(56) References Cited

U.S. PATENT DOCUMENTS

| | | | | |
|---|---|---|---|---|
| 3,608,717 A | * | 9/1971 | Strubel et al. | 209/172 |
| 3,739,910 A | * | 6/1973 | Wilson | 241/60 |
| 4,111,798 A | | 9/1978 | Peterson et al. | |
| 4,746,422 A | * | 5/1988 | Grimm | 209/172 |
| 4,981,876 A | | 1/1991 | Grimmer | |
| 5,653,867 A | | 8/1997 | Jody et al. | |
| 5,988,395 A | * | 11/1999 | Calo et al. | 209/3 |
| 2003/0158309 A1 | * | 8/2003 | Ono et al. | 524/261 |

FOREIGN PATENT DOCUMENTS

| | | |
|---|---|---|
| DE | 43 15 480 A1 | 11/1994 |
| DE | 44 05 903 A1 | 9/1995 |
| DE | 199 49 656 A1 | 4/2001 |
| DE | 103 44 861 A1 | 4/2005 |
| EP | 0 422 460 A2 | 4/1991 |
| EP | 0 918 606 B1 | 6/1999 |

OTHER PUBLICATIONS

Hardtle et al., *Technical Periodical for Treatment and Removal of Rubbish*, 27: 32-34.

(Continued)

*Primary Examiner* — Jeremy R Severson
(74) *Attorney, Agent, or Firm* — Leydig, Voit & Mayer, Ltd.

(57) ABSTRACT

Disclosed is a method for separating differently additivated polymers based on polystyrene, the copolymers and/or blends thereof. This method is used in particular when recycling flame-retardant plastic materials, in particular from old electrical appliances. The method is characterised by a density separation with at least one liquid or gaseous separation medium.

20 Claims, 4 Drawing Sheets

OTHER PUBLICATIONS

Keller, *Waste Economy and Recycling: Problem and Practice*, 146-149 (1977).

English Translation of International Preliminary Report on Patentability from International Patent Application No. PCT/EP2006/005504.

Mäurer et al., "Good as New: Recycling Plastics from WEEE and Packaging Wastes," *Waste Management World*, 33-43 (May-Jun. 2004).

Song, "Typical Flame Retardant/Additive Chemicals for Commercial FR-HIPS and FR-ABS Resins," *Journal of Vinyl & Additive Technology*, 1(1): 46-50 (Mar. 1995).

Uddin et al., "Dehydrohalogenation During Prolysis of Brominated Flame Retardant Containing High Impact Polystrene (HIPS-BR) Mixed with Polyvinychloride (PVC)," *Fuel*, 81: 1819-1825 (2002).

Käufer, "Universal Method for Dehalogenation of Thermoplasts," *Technische Universität Berlin Dissertation (Series of Papers on Plastic Material Research 36)*, 1-186 (May 1996).

* cited by examiner

METHOD FOR SEPARATING DIFFERENTLY ADDITIVATED POLYMER COMPONENTS AND USE THEREOF

FIELD OF THE INVENTION

The invention relates to a method for separating differently additivated polymers based on polystyrene, the copolymers and/or blends thereof. This method is used in particular when recycling flame-retardant plastic materials, in particular from old electrical appliances.

BACKGROUND OF THE INVENTION

Approx. 6 million tonnes of old electrical appliances accumulate in Europe every year. Approximately a fifth of this waste is plastic materials. The EU guideline 2002/96/EC (WEEE directive) demands high salvage quotas which can only be achieved with a material recycling method for the plastic material fractions.

However, material recycling for plastic materials from old electrical appliances is not state of the art because of the material diversity thereof and because of the high pollutant content thereof. There should be mentioned as pollutants the obsolete brominated flame-retardant additives with a high potential for dioxin formation. New works also verify toxic effects of brominated flame retardants themselves, in particular PBDE and PBB.

These additives which were often used previously and which are disposed of with the current old electrical appliances are thus subject in the meantime to prohibitions and strict limits: 2002/95/EC RoHS guideline and Penta guideline 2003/11/EC.

Material recycling of plastic materials from electronic scrap firstly requires material sorting since, in electronic scrap, at least 15 different types of plastic material which are as a rule incompatible must be anticipated. Material sorting can be effected via spectroscopic methods on large plastic material parts (housings of visual display units) or for material sorting of plastic material-containing shredder fractions via a density separation. The latter makes it possible to separate, in a two-stage process, acrylonitrile-butadiene-styrene (ABS) and polystyrene (PS) of a light polyethylene/polypropylene fraction and also of a heavy PVC-rich fraction. Separation of flame-retardant materials based on bromine and non-flame-retardant materials of the middle fraction (ABS and PS) is not effected.

The company Hamos offers the surface discharge spectrometer Slide-Spec-S2 with which simultaneous detection of the type of plastic material and also identification of bromine-containing flame retardants can be effected (http://hamos.com/en/products/plastic-identification.htm).

For disposal of plastic material waste equipped in part with brominated flame-retardant additives from plastic material shredder separation, thermal and raw material methods have therefore been developed, e.g. pyrolysis, such as Haloclean inter alia or Schwarze Pumpe (Uddin, M. A.; Bhaskar, T.; Kaneko J.; Muto, A.; Sakata, Y.; Matsui, T. (2002) "Dehydrohalogenation during pyrolysis of brominate flame retardant containing high impact polystyrene (HIPS.Br) mixed with polyvinyl-chloride (PVC), Fuel 81, pp. 1819-1825).

For high-grade material recycling of the contained plastic materials, various chemical and physical methods have been developed for separation of brominated flame-retardant additives in the laboratory and on a small industrial scale. There are included herein reductive halogenation, as described in Mäurer, A., Schlummer, M. (2004) "Good as new. Recycling plastics from WEEE and packaging waste." Waste Management World, May-June 2004, pp. 33-43, or also selective extraction (Von Quast, O. (1996): Universal method for dehalogenation of thermoplasts. Dissertation at Berlin TU, series of papers on plastic material research 36, editor Prof. Käufer, and EP 0 949 293).

The above-mentioned surface discharge spectrometer can only be used for large plastic material parts and not for automated sorting of shredder plastic materials, i.e. is not suitable for large scale industrial application. Application in specialised dismantling operations is possible but only with high specific time expenditure.

It is disadvantageous in the mentioned thermal and raw material methods that new petrochemical raw materials are produced at best or only the calorific value of the plastic materials is used.

Chemical methods (reductive dehalogenation) require use of expensive reduction agents (e.g. pure sodium) which require in addition a water-free operation, i.e. a very thorough, energy-intensive drying of the waste.

In contrast, the above-mentioned physical methods, which operate on the principle of different solubility characteristics of polymer and flame-retardant additive, display weaknesses in the separation of additives which are difficult to dissolve, in particular decabromodiphenyl ether (DBDE) and 1,2-bis-tribromophenoxy ethane (TBPE). In addition, larger quantities of solvent are required which generally must be recovered by distillation.

Furthermore, the disadvantage of the mentioned thermal, raw material, chemical and physical methods is that the conversion involves high investment costs and can only be operated economically with high throughput quantities (>1000 tonnes per year).

It was therefore the object of the present invention to eliminate the described disadvantages of the state of the art and to provide a method which is easy to operate and therefore economical and which allows separation of flame-retardant-free industrial plastic materials.

BRIEF SUMMARY OF THE INVENTION

Figure 1A:
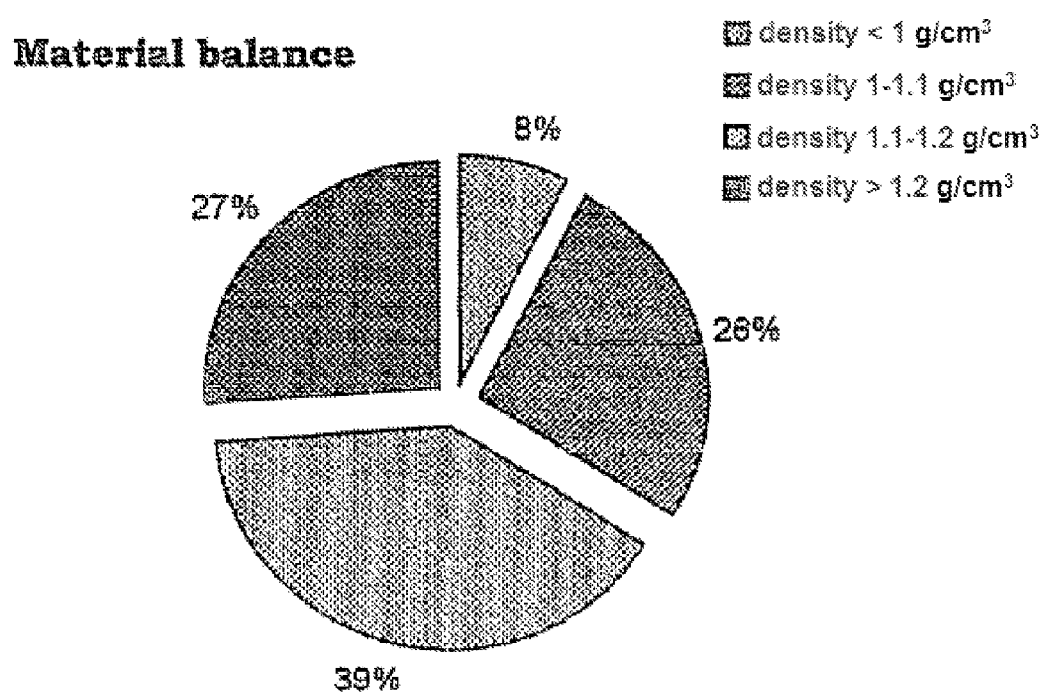
FIG. 1a shows the material balance of a density fractionation according to the method of the invention practised on old electrical appliances illustrated in Example 1.

This object is achieved by the features of the method described herein, and the advantangeous developments thereof. The use of the inventive method is also described.

According to the invention, a method for separating differently additivated polymers based on polystyrene, the copolymers and/or blends thereof is provided. The method according to the invention is thereby based on a density separation with at least one liquid or gaseous separation medium. There are possible as a variant according to the invention static density separations which can be assisted by corresponding influences of the flow of the media. The density separation can be implemented in agitation tanks or cyclones.

Likewise, separations based merely on flow influences are possible as a further variant. There should be mentioned here for example air separation or a fluidised bed.

DETAILED DESCRIPTION OF THE INVENTION

The density separation according to the invention allows for example separation of non-flame-retardant and flame-retardant-free, pollutant-free industrial plastic materials, in particular ABS and high impact PS (HIPS) from plastic material mixtures of electronic scrap. It thereby extends beyond the described two-stage density separation for recovering the fractions PE/PP, ABS/PS and PVC and enables material recycling of the economically interesting middle fraction in compliance with the above-mentioned European standards, 2002/95/EC RoHS guideline and Penta guideline 2003/11/EC.

A bromine-based flame-retardant finishing as an important additive is achieved by the addition of approx. 10 to 20% of brominated flame retardant (J. H. Song, J. Vinyl Addit. Technol. 1 (1995) 46). These flame retardants have a comparatively high density of above 2 $g/cm^3$ (e.g. decabromodiphenyl ether 3.3 $g/cm^3$ and tetrabromobisphenol A 2.2 $g/cm^3$) so that a thus finished ABS or HIPS compound has a density higher by approx. 0.1 to 0.2 $g/cm^3$ than the basic plastic material. Therefore, with the help of a separation medium in the suitable density region, a density separation of differently additivated plastic materials or composite materials can be effected.

It was particularly surprising here that, despite the presence of further fillers by means of which the density of the system is likewise influenced, the separation according to the invention can be achieved.

In contrast to the raw material, thermal, chemical and physical methods cited in prior art, the described method can be replaced on a large industrial scale with units which are commercially available and require only very low investment costs. It can be operated with low personnel costs and spatial requirement and can be presented economically even for small throughput quantities.

Hence the method can be operated by small and medium-sized enterprises in electronic waste salvage and makes it possible for them to have a significant saving in cost. The flame-retardant-free ABS/PS fractions which are recovered by means of modified density separation can be released as reusable materials and do not require to be disposed of with a high cost liability.

The use of expensive reduction agents or solvents which must be regenerated by distillation is avoided. Because of mechanically recyclable separation media, the operating costs can in addition be kept low.

No thermal-mechanical stressing of the polymer takes place and hence also no material damage and no molecular weight degradation. The original polymer properties and the polymer quality are maintained.

Preferably a separation medium is used which has a specific density in the range of 1.06 to 1.14 $g/cm^3$, particularly preferred from 1.08 to 1.12 $g/cm^3$, as a result of which a part of the polymers, i.e. the polymers which are additivated with heavier compounds are collected and consequently separated easily from each other in the sink fraction and the differently additivated polymers, i.e. the polymers which are additivated with lighter compounds, in the float fraction.

With respect to the separation medium, there are fundamentally no restrictions as long as the described separation is effected in the sink and float fraction. Preferably, a mixture of water and a solvent which is miscible with water is used with a density >1 $g/cm^3$, e.g. glycerine, or even a salt solution, e.g. with halogenides of alkaline or alkaline earth metals. These systems confer the advantage that a very precise adjustment of the density can be effected. The polymers of the float fraction are preferably separated mechanically, in particular colanders being used.

The use of mixtures of water and glycerine has the particular advantage that mixtures of this type are not corrosive and enable simultaneous effective washing of the plastic material waste. In addition, mixtures of this type are very simple to regenerate. Loss of water or glycerine can simply be metered in subsequently in order to compensate for deviations from the reference density.

In a simple variant, it is also possible that the sink fraction is sedimented and subsequently separated mechanically, in particular by sieving. Furthermore, the use of a fairly high centrifugal field, e.g. a centrifuge, is preferred since an accelerated separation can be achieved by the centrifugal field.

In addition to liquid separation media, the possibility also exists of producing density separation by air separation, a part of the polymers being entrained by the air flow whilst the differently additivated polymers sink because of their density and thus are separated. In the same way, a fluidised bed can also be used to separate the polymers.

The term plastic materials used in the present application comprises both plastic materials, mixtures thereof or also quite generally composite materials with other materials.

The method is suitable in particular for copolymers and blends of polystyrene. These are selected preferably from the group comprising styrene-butadiene (SB), styrene-acrylonitrile (SAN), acrylonitrile-butadiene-styrene (ABS), acrylic ester-styrene-acrylonitrile (ASA) and blends thereof, e.g. with polycarbonate (PC) or polyphenylene oxide (PPO).

It is likewise possible that the plastic material contains further polymer components. There are included herein for example other polymers selected from the group comprising polyolefins, polyamides, polyvinyl chlorides, polyurethanes, polycarbonates, polyacrylates, polymethacrylates, polyester resins, epoxy resins, polyoxyalkylenes, polyalkylene terephthalates and polyvinyl butyral and copolymers and blends thereof. There are contained as additives in a particularly preferred manner flame retardants and amongst these in particular those based on bromine compounds. There are included herein in particular polybrominated diphenyl ether, polybrominated biphenyls, bis-[dibromopropoxy-dibromophenyl]propane, hexabromodecane and bis-(tribromophenoxy)ethane. The plastic material may also contain low-molecular weight additives, e.g., softeners.

The previously mentioned further polymer components can be separated preferably in a preceding step by at least one further density separation. Thus for example plastic material fractions with a low density can be implemented by a further density separation with a separation medium with a specific density in the range of 0.95 to 1.05 $g/cm^3$. Polymer components with a higher density can be implemented for example by a further density separation with a separation medium with a specific density in the range of 1.15 to 1.25 $g/cm^3$.

It is fundamentally also possible of course that further non-polymer components of the basic material are removed in the implemented density separations, e.g. dirt particles can be removed by filtration.

The method according to the invention can be applied to
housing fractions from the dismantling of visual display
units which have low material diversity, ABS and PS containing plastic material shredders from electronic scrap reprocessing which are enriched according to the state of the art via density fractionation.

The subject according to the invention is intended to be explained in more detail with reference to the subsequent Figures and examples without wishing to restrict the latter to the special embodiments shown here.

EXAMPLE 1

Housing plastic material waste from old electrical appliance dismantling

ABS, HIPS and further styrene copolymers are enriched by a two-stage density separation with separation layers 1.0 g/cm$^3$ (water) and 1.2 g/cm$^3$ (mixture of water/glycerine) from a plastic material waste mixture from the dismantling of old appliances. The density separation is thereby effected in 5 liter agitation reactors at a S/L ratio of 1:5. The target fraction 1.0 to 1.2 g/cm$^3$ comprises 65% by weight. In a further step, this target fraction is fractionated in a mixture of glycerine/water with the density of 1.1 g/cm$^3$. The float fraction (density 1.0 to 1.1 g/cm$^3$) is sieved off, the sink fraction is likewise obtained by sieving. All of the four fractions (density <1, 1.0 to 1.1, 1.1 to 1.2 and >1.2 g/cm$^3$) are dried, weighed and analysed by means of x-ray fluorescence measurement (ED-RFA-appliance by the Spectro company) for bromine. These values allow a material and a bromine balance.

Figure 1B:
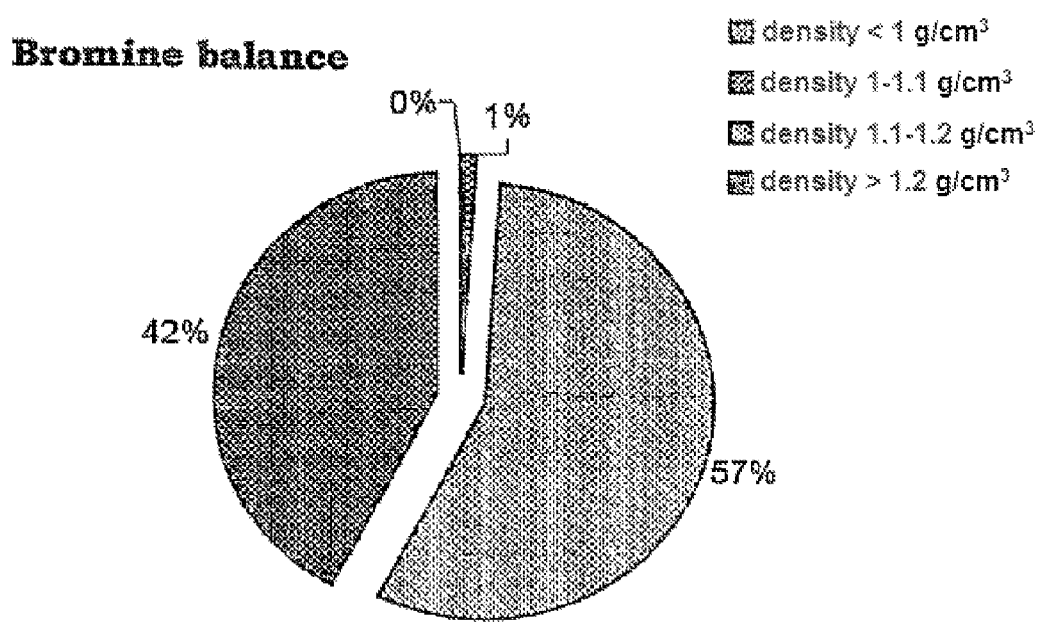
FIG. 1b shows the bromine balance of a density fractionation according to the method of the invention practised on old electrical appliances illustrated in Example 1.

The target fraction of the method (density 1.0 to 1.1 g/cm$^3$) comprises 26% of the input material but only 0.9% of the bromine load (FIG. 1a and FIG. 1b). Separation of the brominated flame retardant is hence highly effective.

The specific flame retardant analysis for octabromodiphenyl ether by means of HPLC-UV/MS[10] gave the result that the target fraction is safely below the limit of 1000 ppm whilst, in the two heavy fractions, it is significantly exceeded. Table 1 sets forth the concentration of octabromodiphenyl ether of the various density fractions.

TABLE 1

| Density fraction [g/cm$^3$] | Concentration octabromodiphenyl ether [ppm] |
|---|---|
| <1 | 400 |
| 1.0-1.1 | 470 |
| 1.1-1.2 | 18,250 |
| >1.2 | 29,700 |
| limit | 1,000 |

EXAMPLE 2

Plastic Material-rich Shredder Light Fraction from Electronic Scrap Salvage

Figure 2A:
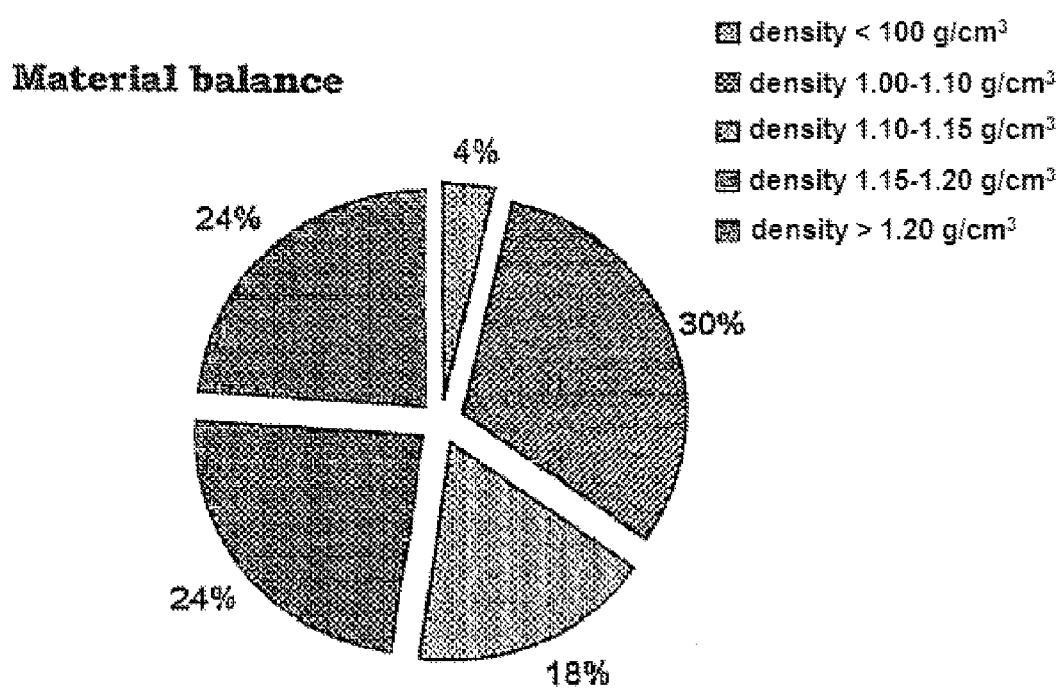
FIG. 2a shows the material balance of a density fractionation according to the method of the invention practised on a plastic shredder waste illustrated in Example 2.
Figure 2B:
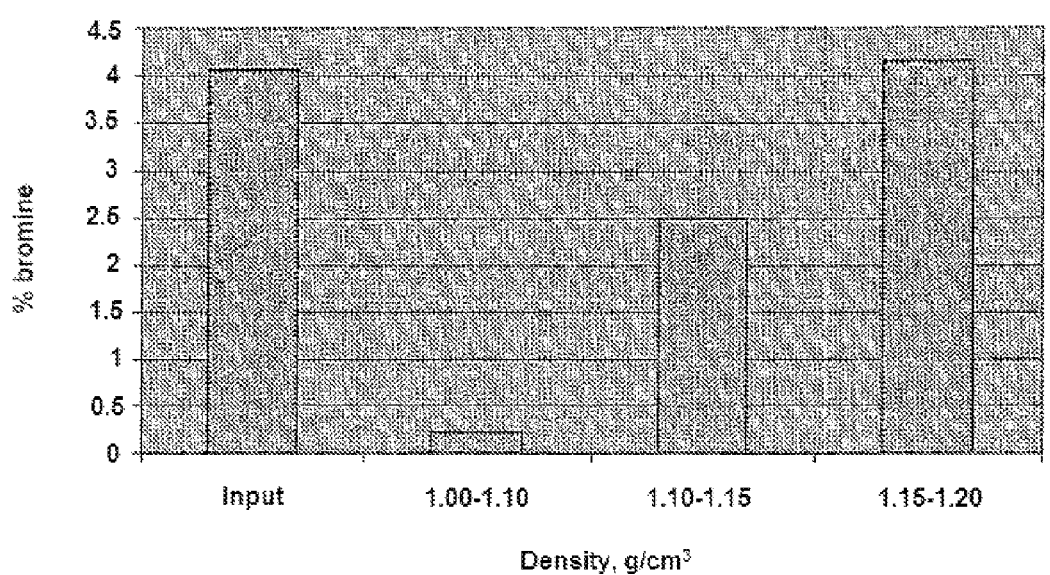
FIG. 2b shows the bromine balance of of a density fractionation according to the method of the invention practised on a plastic shredder waste illustrated in Example 2.

Plastic material waste from the shredder light fraction of electronic scrap salvage is fractionated in density separation media of densities 1.0, 1.10, 1.15 and 1.20 g/cm$^3$ (water or defined water-Mucasol®-common salt mixtures) in agitation reactors. The material balance is illustrated in FIG. 2a. The fractions 1.0 to 1.1, 1.10 to 1.15 and 1.15 to 1.20 g/cm$^3$ were analysed subsequently by means of x-ray fluorescence measurement (ED-RFA appliance by the Spectro company) for bromine (see bromine contents in FIG. 2b).

The target fraction of the described invention 1.0 to 1.1 g/cm$^3$ corresponds to 30% by weight of the input material and contains below 0.04% bromine. Even in the improbable case where only octabromodiphenyl ether (Br content 79%) is responsible for the Br content, the limit of 1000 ppm is maintained (calculated maximum concentration of OctaBDE: 500 ppm).

The invention claimed is:

1. A method for separating flame-protected from flame-retardant-free polymers from a mixture comprising flame-protected and flame-retardant-free polymers based on polystyrene, the copolymers and/or blends thereof, the method comprising:

contacting said mixture comprising flame-protected and flame-retardant free polymers based on polystyrene, the copolymer and/or blends thereof with at least one liquid or gaseous separation medium;

wherein the separation medium is a mixture of water and a solvent miscible with water with a density >1 g/cm$^3$ or a salt solution and wherein the separation medium has a specific density in the range of 1.06 to 1.14 g/cm$^3$ so that the polymers in a sink fraction are separated from those in a float fraction, or a separation being effected by means of an air separator, wherein a part of the polymers being entrained more strongly by the air flow of said separator whilst another part of the polymers being deflected less because of their density.

2. The method according to claim 1, wherein the solvent is glycerine.

3. The method according to claim 1, wherein the polymers of the float fraction are separated mechanically.

4. The method according to claim 3, wherein the polymers of the float fraction are separated mechanically by sieving.

5. The method according to claim 1, wherein the sink fraction is sedimented.

6. The method according to claim 5, wherein the sedimented sink fraction is separated mechanically.

7. The method according to claim 6, wherein the sedimented sink fraction is separated mechanically by sieving.

8. The method according to claim 1, wherein the separation of the polymers is accelerated by a centrifugal field.

9. The method according to claim 1, wherein the separation effected by means of an air separator is effected with a fluidised bed.

10. The method according to claim 1, wherein the copolymers and blends of polystyrene are selected from the group consisting of styrene-butadiene (SB), styrene-acrylonitrile (SAN), acrylonitrile-butadiene-styrene (ABS), acrylic ester-styrene-acrylonitrile (ASA) and blends thereof.

11. The method according to claim 10, wherein the blends of said styrene-butadiene (SB), styrene-acrylonitrile (SAN), acrylonitrile-butadiene-styrene (ABS), and acrylic ester-styrene-acrylonitrile (ASA) are blends with polycarbonate (PC) or polyphenylene oxide (PPO).

12. The method according to claim 1, wherein the mixture of polymers contains further polymer components and/or non-polymer components.

13. The method according to claim 12, wherein the further polymer components are selected from the group consisting of polyolefins, polyamides, polyvinyl chlorides, polyurethanes, polycarbonates, polyacrylates, polymethacrylates, polyester resins, epoxy resins, polyoxyalkylenes, polyalkylene terephthalates and polyvinyl butyral and copolymers and blends thereof.

14. The method according to claim 12, wherein the further polymer components are separated in a preceding step by at least one further density separation.

15. The method according to claim 14, wherein preceding the further density separation is implemented with a separation medium with a specific density in the range of 0.95 to 1.05 g/cm$^3$.

16. The method according to claim 14, wherein the further density separation is implemented with a separation medium with a specific density in the range of 1.15 to 1.25 g/cm$^3$.

17. The method according to claim 12, wherein the further non-polymer components are separated by a density separation method.

18. The method according to claim 1, wherein the flame retardants are based on bromine compounds.

19. The method according to claim 18, wherein the mixture of polymers includes softeners as additives.

20. A method for separating flame-protected from flame-retardant-free polymers from a mixture comprising flame-protected and flame-retardant-free polymers based on polystyrene, the copolymers and/or blends thereof, the method comprising:
- contacting said mixture comprising flame-protected and flame-retardant free polymers based on polystyrene, the copolymer and/or blends thereof with at least one liquid or gaseous separation medium;
- wherein the separation medium is a mixture of water and a solvent miscible with water with a density >1 g/cm$^3$ or a salt solution and wherein the separation medium has a specific density in the range of 1.08 to 1.14 g/cm$^3$ so that the polymers in a sink fraction are separated from those in a float fraction.

* * * * *